United States Patent
Ito et al.

(10) Patent No.: US 11,303,240 B2
(45) Date of Patent: Apr. 12, 2022

(54) TRAVELING CONTROL DEVICE

(71) Applicant: Kubota Corporation, Osaka (JP)

(72) Inventors: Hirokazu Ito, Sakai (JP); Yasuhiro Manji, Sakai (JP)

(73) Assignee: Kubota Corporation, Osaka (JP)

( * ) Notice: Subject to any disclaimer, the term of this patent is extended or adjusted under 35 U.S.C. 154(b) by 247 days.

(21) Appl. No.: 16/411,433

(22) Filed: May 14, 2019

(65) Prior Publication Data

US 2020/0014320 A1 Jan. 9, 2020

(30) Foreign Application Priority Data

Jul. 3, 2018 (JP) .............................. JP2018-126921
Aug. 1, 2018 (JP) .............................. JP2018-145121

(51) Int. Cl.
*H02P 23/00* (2016.01)
*B60L 50/51* (2019.01)
*B60L 15/00* (2006.01)
*B60L 15/02* (2006.01)
*B60L 15/20* (2006.01)

(Continued)

(52) U.S. Cl.
CPC ........ *H02P 23/0004* (2013.01); *B60L 15/007* (2013.01); *B60L 15/02* (2013.01); *B60L 15/20* (2013.01); *B60L 50/51* (2019.02); *A01D 34/006* (2013.01); *A01D 34/66* (2013.01); *A01D 2101/00* (2013.01); *B60L 2210/40* (2013.01); *B60L 2220/42* (2013.01); *B60L 2220/46* (2013.01); *B60L 2240/16* (2013.01); *B60L 2240/461* (2013.01)

(58) Field of Classification Search
None
See application file for complete search history.

(56) References Cited

U.S. PATENT DOCUMENTS 6,672,412 B1    1/2004   Charlson
6,988,570 B2 *  1/2006   Takeuchi ................ B60L 50/52
                                                      180/6.48

(Continued)

FOREIGN PATENT DOCUMENTS

EP          1916142 A2      4/2008
JP        2008168870 A      7/2008
(Continued)

*Primary Examiner* — Tamara L Weber
(74) *Attorney, Agent, or Firm* — The Webb Law Firm (57) ABSTRACT

Provided is a traveling control device capable of appropriately controlling the turning and the speed of a traveling vehicle. The traveling control device includes: an instruction receiving portion that receives an operation instruction directed to each of the pair of left and right driving wheels; a speed instruction value calculation portion that calculates a speed instruction value that is to be instructed to the traveling control unit; an operation instruction determination portion that determines whether the operation instruction is an operation instruction to rotate the pair of driving wheels in the same direction or an operation instruction to rotate the pair of driving wheels in different directions; and a speed instruction value correction portion that corrects, if the operation instruction is an operation instruction to rotate the pair of driving wheels in the same direction, one of the speed instruction values, based on the other speed instruction value.

5 Claims, 5 Drawing Sheets (51) Int. Cl.
 *A01D 34/00* (2006.01)
 *A01D 34/66* (2006.01)
 *A01D 101/00* (2006.01)

(56) References Cited

U.S. PATENT DOCUMENTS

| | | | |
|---|---|---|---|
| 7,906,919 B2 | 3/2011 | Nakamura et al. | |
| 8,989,964 B2 * | 3/2015 | Yasui | B62D 11/003 |
| | | | 701/41 |
| 2011/0127093 A1 * | 6/2011 | Koga | B62D 11/04 |
| | | | 180/6.24 |
| 2016/0068081 A1 * | 3/2016 | Li | B60L 15/025 |
| | | | 701/22 |

FOREIGN PATENT DOCUMENTS

| | | | |
|---|---|---|---|
| JP | 20106126 A | | 1/2010 |
| JP | 2017038463 | * | 2/2017 |
| JP | 2017132406 A | | 8/2017 |
| JP | 2017178168 A | | 10/2017 |

\* cited by examiner

TRAVELING CONTROL DEVICE

CROSS-REFERENCE TO RELATED APPLICATIONS

This application claims priority to Japanese Patent Application Nos. 2018-126921 and 2018-145121, filed Jul. 3, 2018 and Aug. 1, 2018, respectively, the disclosures of which are hereby incorporated by reference in their entirety.

BACKGROUND OF THE INVENTION

1. Field of the Invention

The present invention relates to a traveling control device of a traveling vehicle capable of driving each of a pair of left and right driving wheels.

2. Description of the Related Art

As the techniques for enhancing the steerability of vehicles, techniques for driving each of a pair of left and right driving wheels independently of each other have hitherto been studied. Examples of techniques of this kind include the technique described in Patent Document 1 cited below.

Patent Document 1 describes a vehicle steering device. In this vehicle steering device, left and right operating handles are attached to the body of a vehicle such that they can be rotated independently of each other. When the left and right operating handles are rotated in the same rotation direction as each other, a turning device is controlled according to a first rotation angle. When the left and right operating handles are rotated in opposite rotation directions to each other, the forward movement, the backward movement, and the traveling speed of a traveling device are controlled according to a second rotation angle.

For such a traveling vehicle, proportional-integral (PI) control is used to control the current flowing through a motor. Since PI control is known, a detailed description thereof is omitted. In PI control, control is performed using "proportional action" and "integral action" in combination. Examples of the technique for controlling the driving of a vehicle using PID control, which is an extension of such PI control, include the technique described in Patent Document 2 cited below.

Patent Document 2 describes a vehicle control apparatus (hereinafter referred to as "control apparatus") that uses PID control to control the currents of motors for driving the wheels of a vehicle. To enable stabilization of the behavior of the vehicle even when steering is unsteady, the control apparatus includes an integral term correction gain calculation portion that calculates an integral term correction gain for correcting the output of an integral term in the PID control, based on a steering angle calculated from a yaw rate that can be determined from the curvature of a traveling path and the vehicle speed, and a steered steering angle over which the driver performed steering. In particular, the integral term correction gain is calculated based on a derivation value obtained by determining a time derivative of the result of comparing the steering angle calculated from the yaw rate with the steered steering angle, and is configured such that the larger the derivation value is, the smaller the integral term correction gain is.

PRIOR ART DOCUMENTS

Patent Documents

Patent Document 1: JP 2010-6126A
Patent Document 2: JP 2017-132406A

SUMMARY OF THE INVENTION

In the technique described in Patent Document 1, whether an input to the operating handles is slow steering or rapid steering is determined by comparing the left and right steering angles with preset fixed first and second reference steering angles. Specifically, when the steering angle input to the operating handles is smaller than the first reference steering angle, the rotation speed of the electric motor located on the inner side of a turn is controlled to be reduced by a certain value, thus turning the vehicle inward in the turning direction. On the other hand, when the steering angle input to the operating handles falls within a range from the first reference steering angle to the second reference steering angle, the electric motor located on the inner side of a turn is stopped, and thus the vehicle can readily turn inward in the turning direction. Furthermore, when the steering angle input to the operating handles is larger than the second reference steering angle, control is performed to counter-rotate the electric motor located on the inner side of a turn, and thus the vehicle rapidly turns inward in the turning direction.

For example, when turning the vehicle on the spot by rotating the pair of left and right driving wheels in opposite directions to each other, the operation handles are operated irrespective of the movement of the vehicle body, without being subjected to any reaction force from mechanisms such as a transmission, a speed reducer, and an engine. Accordingly, there is a possibility that the turning operation will be input over-sensitively. Therefore, there is also the possibility that the speed of the vehicle cannot be appropriately controlled.

Some traveling vehicles can travel with a tight turning radius such that the vehicle is turned on the spot by rotating one of a pair of left and right motors, while stopping the other motor. At that time, the operating lever through which an operating instruction is given to the one motor receives many low speed instructions in the neighborhood of zero speed. In such a case, according to the technique described in Patent Document 2, when the integral term correction gain is set based on a derivation value obtained by determining a time derivative of the result of comparing the steering angle calculated from a yaw rate with the steered steering angle, there is the possibility of the driving wheels being locked at the zero speed (including an extremely low speed), thus forming unwanted marks in the ground surface.

Therefore, there is a need for a traveling control device capable of appropriately turning a traveling vehicle.

A characteristic feature of a traveling control device according to an embodiment of the present invention lies in a traveling control device of a traveling vehicle including a traveling control unit having a pair of left and right configurations capable of respectively driving a pair of left and right driving wheels, the traveling control device including: an instruction receiving portion that receives an operation instruction directed to each of the pair of left and right driving wheels; a speed instruction value calculation portion that calculates a speed instruction value that is to be instructed to the traveling control unit, based on each of the operation instructions; an operation instruction determination portion that determines, based on each of the operation instructions, whether the operation instruction is an operation instruction to rotate the pair of left and right driving wheels in the same direction as each other, or an operation instruction to rotate the pair of left and right driving wheels in different directions from each other; and a speed instruction value correction portion that corrects, if the operation instruction is an operation instruction to rotate the pair of left and right driving wheels in the same direction as each other, one of the speed instruction values calculated for the traveling control unit by the speed instruction value calculation portion, based on the other speed instruction value.

With such a characteristic feature, it is possible to reduce the turning speed, and improve the ability to travel straight ahead. Furthermore, it is possible to prevent a reduction in the maximum speed of the traveling vehicle despite the turning speed being attenuated. Therefore, with the traveling control device according to the present invention, it is possible to appropriately turn the traveling vehicle, and appropriately control the speed of the traveling vehicle.

It is preferable that the speed instruction value correction portion corrects the larger one of the speed instruction values calculated for the traveling control unit by the speed instruction value calculation portion, based on the smaller speed instruction value.

With such a configuration, it is possible to reduce over-sensitive turning through simple calculation performed with software. Therefore, it is not necessary to separately provide any mechanism for reducing over-sensitive turning, thus making it possible to realize a traveling control device at a low cost.

It is preferable that the speed instruction value correction portion corrects, if the operation instruction is an operation instruction to rotate the pair of left and right driving wheels in different directions from each other, each of the speed instruction values calculated for the traveling control unit by the speed instruction value calculation portion, based on a preset common attenuation value.

With such a configuration, it is also possible to attenuate the over-sensitive turning when rotating the traveling vehicle on the spot.

A characteristic feature of a traveling control device according to an embodiment of the present invention lies in a traveling control device of a traveling vehicle capable of driving each of a pair of left and right driving wheels, the traveling control device including: a pair of left and right motors that respectively drive the pair of left and right driving wheels, and a current that is passed therethrough is controlled by PI control; an instruction receiving portion that receives an operation instruction directed to each of the pair of left and right motors; an operation instruction determination portion that determines whether each of the operation instructions is an acceleration instruction or a deceleration instruction directed to the corresponding motor; a speed control portion that, if the operation instruction is an acceleration instruction, sets an integral gain in the PI control to a preset first value, and sets a proportional gain in the PI control to a preset second value when a rotation speed of each of the motors becomes greater than or equal to a preset first threshold, if the operation instruction is a deceleration instruction, sets the integral gain to zero, and sets the proportional gain to a preset third value when the rotation speed of the motor becomes less than a preset second threshold that is smaller than the first threshold; and a motor driving portion that drives the motors, based on the integral gain and the proportional gain set by the speed control portion.

With such a characteristic feature, if the operation instruction is a deceleration instruction, the integral gain becomes zero when a predetermined condition is satisfied. Accordingly, the designation (operation instruction) and the actual operation are separated from each other when the driving wheel is affected by a disturbance. For example, when the right driving wheel is driven at the maximum speed, and an extreme low speed instruction is input to the left driving wheel, the left driving wheel will follow the movements of the right driving wheel and the vehicle body, and be rotated by more than the instructed amount, thus being kept from forming unwanted marks in the ground surface. Therefore, with the traveling control device according to the present invention, it is possible to suppress the formation of unwanted marks in the ground surface during traveling.

It is preferable that switching of each of the integral gain and the proportional gain has a hysteresis.

With such a configuration, it is possible to prevent an erroneous operation in the neighborhood of thresholds (the first threshold and the second threshold) of the rotation speed.

It is preferable that, when a vehicle speed of the traveling vehicle is less than a preset value, if the operation instruction is a deceleration instruction, the motor driving portion drives the corresponding motor by a torque control in accordance with an output torque of the motor instead of driving the motor in accordance with the rotation speed, even when the rotation speed of the motor is less than the second threshold.

With such a configuration, for example, even in a situation where the ground surface on which the traveling vehicle travels is slippery and the driving wheels slip, it is possible to prevent slipping by using the torque control, thus making it possible to prevent formation of unwanted marks in the ground surface.

DETAILED DESCRIPTION OF PREFERRED EMBODIMENTS

A traveling control device according to the present invention is configured to appropriately turn a traveling vehicle, and to appropriately control the speed of the traveling vehicle. Hereinafter, a traveling control device 1 according to the present embodiment will be described. The traveling control device 1 is installed in a traveling vehicle that includes a traveling control unit 3 that has a pair of left and right configurations capable of respectively driving a pair of left and right driving wheels 2 (see FIG. 3).

Figure 1:
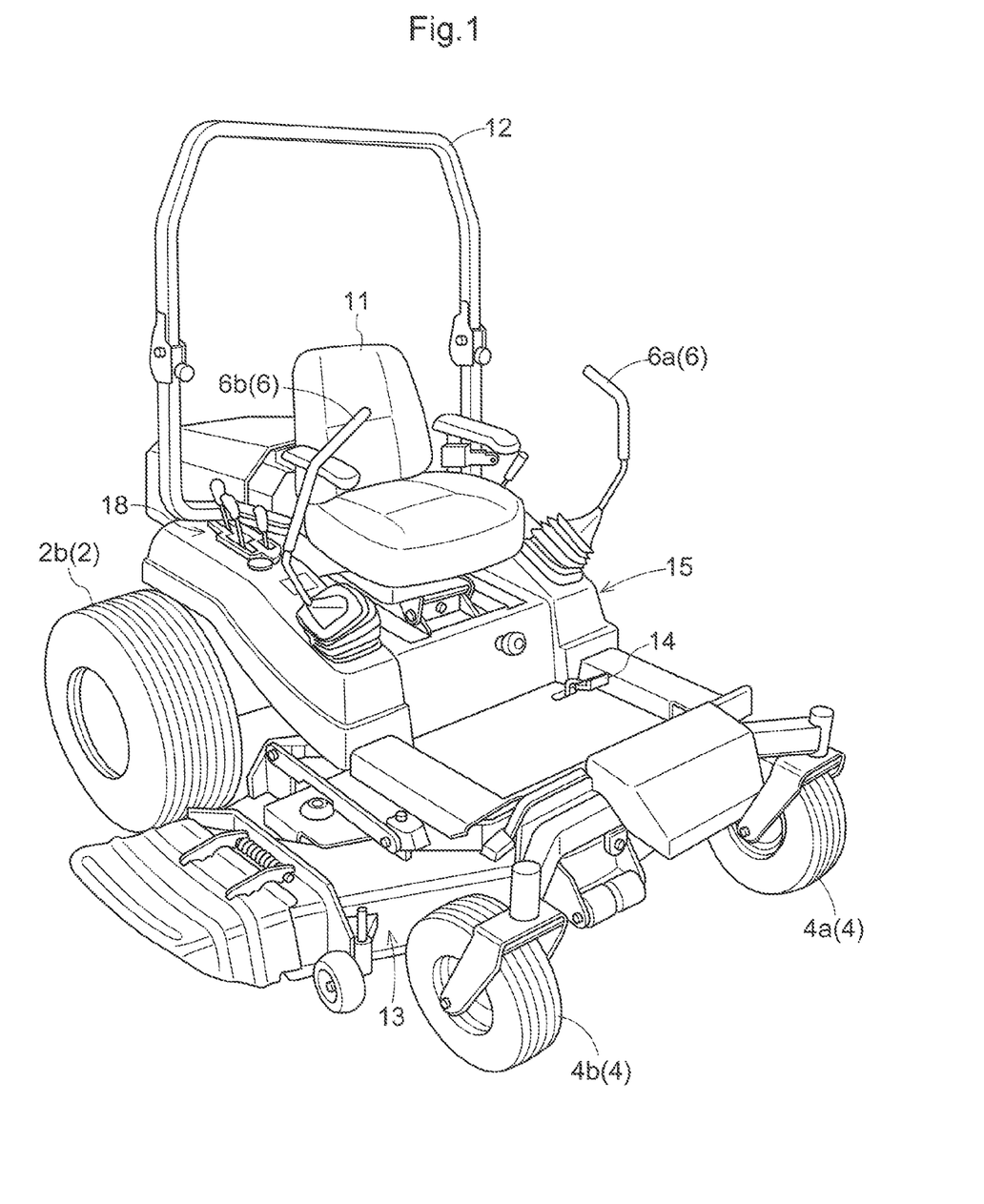
FIG. 1 is a perspective view of a traveling vehicle in which a traveling control device is installed.
Figure 2:
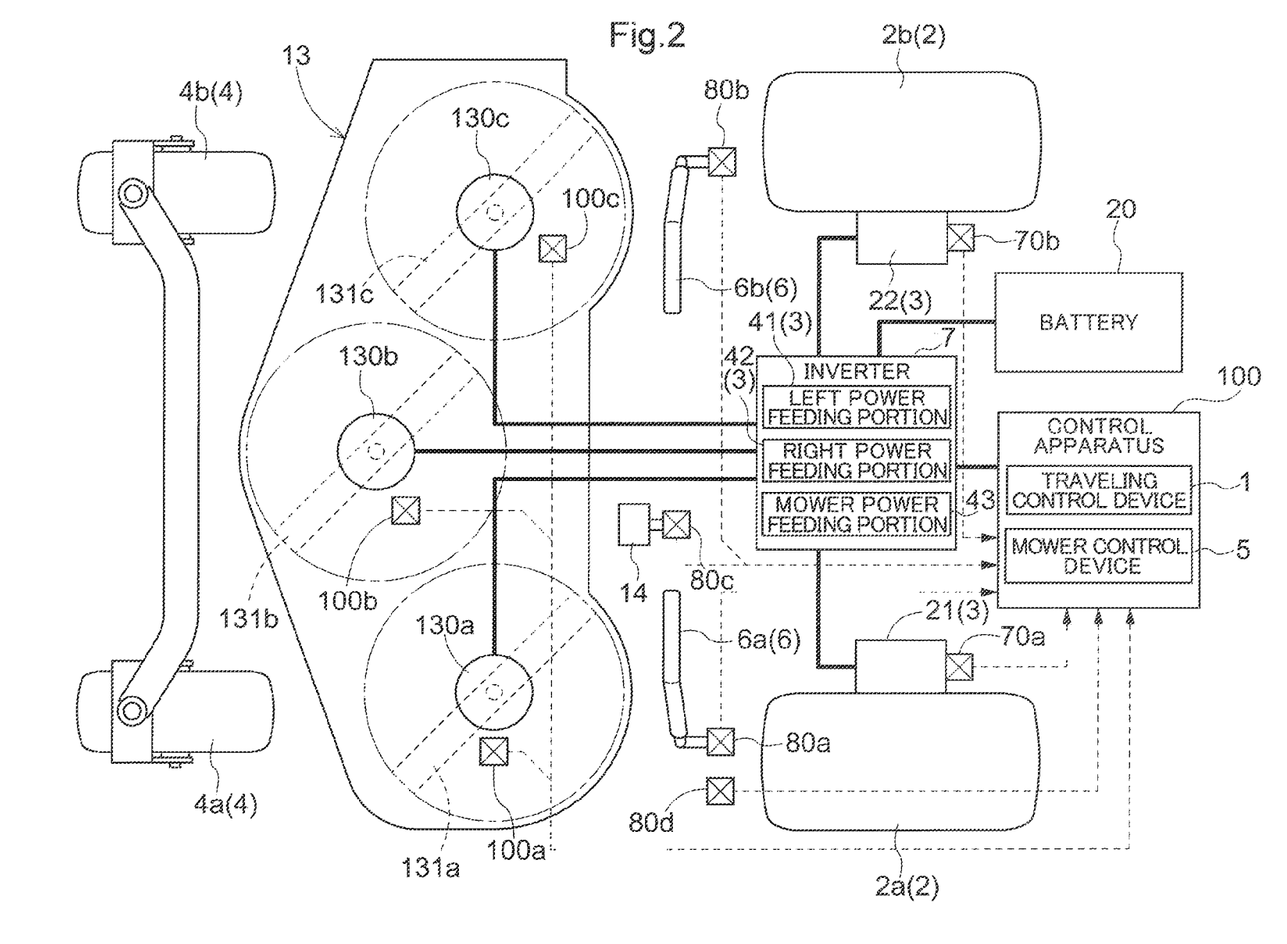
FIG. 2 is a system diagram showing an electric system and a power system of the traveling vehicle.

FIG. 1 shows a perspective view of an electric riding lawn mower, which is an example of the traveling vehicle in which the traveling control device 1 according to the present embodiment is installed. FIG. 2 shows an electric system diagram and a power system diagram. As shown in FIGS. 1 and 2, the electric riding lawn mower includes a vehicle body 15 supported by caster wheels 4, which are front wheels, and driving wheels 2, which are rear wheels, a battery 20 disposed at the rear of the vehicle body 15, a driver's seat 11 disposed forward of the battery 20, a fall protection frame 12 provided standing upright from behind the driver's seat 11, and a mower unit 13 suspended between the caster wheels 4 and the driving wheels 2 from the vehicle body 15 such that the mower unit 13 can be raised and lowered via an elevation link mechanism from and to the space below the vehicle body 15. The driving wheels 2 are driven by the traveling control unit 3, the operations of which are controlled by the traveling control device 1, and the operations of the mower unit 13 are controlled by a mower control device 5. Here, the caster wheels 4 include a left caster wheel 4a and a right caster wheel 4b, and the driving wheels 2 include a left driving wheel 2a and a right driving wheel 2b.

A floor plate, which is a footrest for the driver, is provided forward of the driver's seat 11, and a brake pedal 14 protrudes from the floor plate. A left steering lever 6a and a right steering lever 6b are disposed on opposite sides of the driver's seat 11. Additionally, an electric operation panel 18 including a switch button, a switch lever, and the like of an electric control system is provided laterally to the driver's seat 11. A mower switch for starting the mower unit 13 is also disposed on the electric operation panel 18. Note that the left steering lever 6a and the right steering lever 6b are described as a steering lever 6 when there is no particular need to distinguish between them.

In the present embodiment, the left driving wheel 2a and the right driving wheel 2b respectively use the rotational force from a left motor 21 and a right motor 22, which are in-wheel motors, as their power sources. Power is supplied to the left motor 21 via a left power feeding portion 41 that is a constituent element of an inverter 7, and power is supplied to the right motor 22 via a right power feeding portion 42 that is a constituent element of the inverter 7. By changing the power supplied to each of the motors, it is possible to change at least one of the rotation speed and the torque. The rotation speeds (peripheral speeds) of the left driving wheel 2a and the right driving wheel 2b can be made different from each other, and the direction of the electric riding lawn mower is changed using the rotation speed difference between the left driving wheel 2a and the right driving wheel 2b.

The traveling control unit 3 is a functional portion that controls the traveling and the turning of the electric riding lawn mower, and, in the present embodiment, includes the left motor 21, the right motor 22, and the inverter 7 (in particular, the left power feeding portion 41 and the right power feeding portion 42) described above. The inverter 7 supplies power to each of the left motor 21 and the right motor 22. Although power that is output from the inverter 7 corresponds to a speed instruction value (target value) calculated by the traveling control device 1, the power is modified to increase the motor output torque when the actual rotation speed (actual speed) has become smaller than the target value owing to the traveling load. On the other hand, when the actual rotation speed (actual speed) has become larger than the target value, for example, when on a downward slope or the like, the power is modified to decrease the motor output torque.

The mower unit 13 includes three rotary blades 131a, 131b, and 131c. The rotary blades 131a, 131b, and 131c respectively use mower motors 130a, 130b, and 130c as their driving sources. Power is supplied to the mower motors 130a, 130b, and 130c via a mower power feeding portion 43 that is a constituent element of the inverter 7. The mower power feeding portion 43 is controlled by the mower control device 5. The mower control device 5 and the traveling control device 1 described above together constitute a control apparatus 100.

The operation amount (pivoting angle) of the left steering lever 6a is detected by a left steering angle detection sensor 80a, and the operation amount (pivoting angle) of the right steering lever 6b is detected by a right steering angle detection sensor 80b. The operating angle of the brake pedal 14 is detected by a brake detection sensor 80c, and operation of the mower switch is detected by a mower sensor 80d. The rotation speed of the left driving wheel 2a is detected by a left rear wheel rotation detection sensor 70a, and the rotation speed of the right driving wheel 2b is detected by a right rear wheel rotation detection sensor 70b. The rotation speeds of the mower motors 130a, 130b, and 130c are detected by rotation sensors 100a, 100b, and 100c. The detection results obtained by the sensors are transmitted to the control apparatus 100, and are used by the traveling control device 1 and the mower control device 5 as needed.

In the traveling control device 1, the target rotation speeds of the left driving wheel 2a and the right driving wheel 2b are calculated based on the operation amounts of the steering levers 6 detected by the left steering angle detection sensor 80a and the right steering angle detection sensor 80b. Furthermore, the amounts of power that are supplied to the left motor 21 and the right motor 22 are calculated from the respective target rotation speeds. Based on the power amounts, the traveling control device 1 drives the left motor 21 and the right motor 22. Here, depending on the traveling conditions, the actual rotation speeds of the driving wheels 2 may not match the target rotation speeds that are controlled based on the operation amount of the steering levers 6. In such a case, the traveling control device 1 uses a known feedback control to correct the above-described power amounts such that the actual rotation speeds of the driving wheels 2 match the target rotation speeds based on the operation amounts of the steering levers 6. At this time, the traveling control device 1 calculates the required driving torque (hereinafter simply referred to as "required torque") requested for the left motor 21 and the right motor 22. The required torque means the amount of torque requested for the left motor 21 or the right motor 22 in order to match the actual rotation speed to the target speed when the actual rotation speed has not reached the target rotation speed. The traveling control device 1 derives the required torque from the target rotation speeds of the left driving wheel 2a and the right driving wheel 2b based on the detection results obtained by the left steering angle detection sensor 80a and the right steering angle detection sensor 80b, and the actual rotation speeds of the left driving wheel 2a and the right driving wheel 2b obtained by the left rear wheel rotation detection sensor 70a and the right rear wheel rotation detection sensor 70b. Then, based on the calculated required torque, the traveling control device 1 corrects the power amounts.

Rotation Direction Control of Driving Wheels

Figure 3:
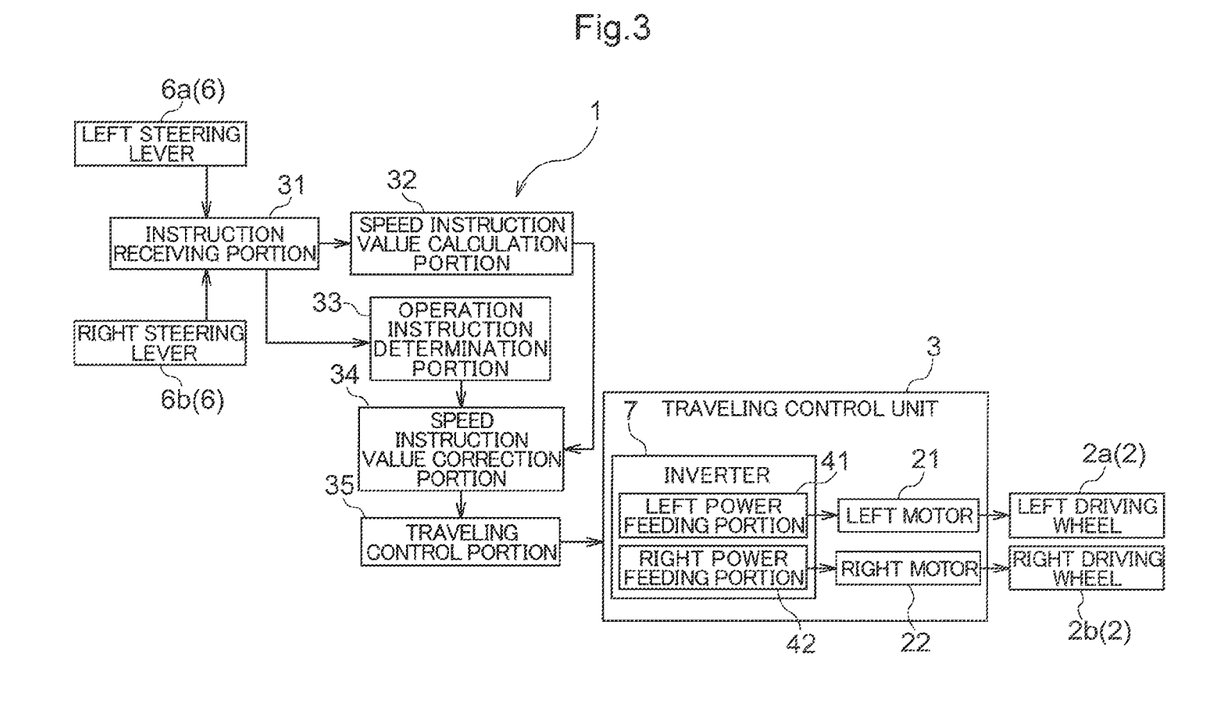
FIG. 3 is a block diagram showing a configuration of the traveling control device.

FIG. 3 is a block diagram schematically showing a configuration of the traveling control device 1. As shown in FIG. 3, the traveling control device 1 includes various functional portions, namely, an instruction receiving portion 31, a speed instruction value calculation portion 32, an operation instruction determination portion 33, a speed instruction value correction portion 34, and a traveling control portion 35. Each of these functional portions is constructed by hardware or software, or both hardware and software, with a CPU serving as the core member, in order to execute processes relating to the traveling and the turning of the electric riding lawn mower. Note that FIG. 3 also shows the left steering lever 6a, the right steering lever 6b, the traveling control unit 3, the left driving wheel 2a, and the right driving wheel 2b described above, in addition to the traveling control device 1.

The instruction receiving portion 31 receives an operation instruction directed to each of the pair of left and right driving wheels 2. The pair of left and right driving wheels 2 are the left driving wheel 2a and the right driving wheel 2b. The operation instruction directed to each of the pair of left and right driving wheels 2 is an instruction including a rotation direction and a rotation speed that are requested for each of the left driving wheel 2a and the right driving wheel 2b. The operation instruction directed to the left driving wheel 2a is input through the left steering lever 6a, and the operation instruction directed to the right driving wheel 2b is input through the right steering lever 6b. The operation instruction directed to the left driving wheel 2a corresponds to a detection result obtained by the left steering angle detection sensor 80a (hereinafter, see FIG. 2 for all cases), and the operation instruction directed to the right driving wheel 2b corresponds to a detection result obtained by the right steering angle detection sensor 80b (hereinafter, see FIG. 2 for all cases). Accordingly, the instruction receiving portion 31 receives the operation instruction directed to the left driving wheel 2a via the left steering angle detection sensor 80a, and receives the operation instruction directed to the right driving wheel 2b via the right steering angle detection sensor 80b. The operation instructions received by the instruction receiving portion 31 are transmitted to the speed instruction value calculation portion 32 and the operation instruction determination portion 33, which will be described below.

The speed instruction value calculation portion 32 calculates a speed instruction value that is instructed to the traveling control unit 3, based on each of the operation instructions. As described above, the operation instructions are transmitted from the instruction receiving portion 31. The traveling control unit 3 includes the inverter 7, the left motor 21, and the right motor 22, and controls the traveling and the turning of the electric riding lawn mower. Here, an operation instruction is an instruction including a rotation direction and a rotation speed that are requested for each of the left driving wheel 2a and the right driving wheel 2b. A speed instruction value is an instruction value of the rotation speed requested for each of the left motor 21 and the right motor 22 in order for each of the left driving wheel 2a and the right driving wheel 2b to achieve the rotation direction and the rotation speed, which constitute the operation instruction. Accordingly, the speed instruction value calculation portion 32 calculates the respective rotation speeds of the left motor 21 and the right motor 22 that enable the left driving wheel 2a and the right driving wheel 2b to achieve the respective rotation directions and rotation speeds requested as the operation instructions. The calculation result obtained by the speed instruction value calculation portion 32 is transmitted to the speed instruction value correction portion 34, which will be described below.

The operation instruction determination portion 33 determines, based on each of the operation instructions, whether the operation instruction is an operation instruction to rotate the pair of left and right driving wheels 2 in the same direction as each other, or an operation instruction to rotate the pair of left and right driving wheels 2 in different directions from each other.

Here, in the present embodiment, when the left steering lever 6a is tilted in a forward direction relative to its position in the neutral state, the left motor 21 is rotated such that the left driving wheel 2a causes the electric riding lawn mower to travel in the forward direction. Similarly, when the left steering lever 6a is tilted in a backward direction relative to its position in the neutral state, the left motor 21 is rotated such that the left driving wheel 2a causes the electric riding lawn mower to travel in the backward direction. When the right steering lever 6b is tilted in a forward direction relative to its position in the neutral state, the right motor 22 is rotated such that the right driving wheel 2b causes the electric riding lawn mower to travel in the forward direction. When the right steering lever 6b is tilted in a backward direction relative to its position in the neutral state, the right motor 22 is rotated such that the right driving wheel 2b causes the electric riding lawn mower to travel in the backward direction. The left steering lever 6a and the right steering lever 6b are configured not to rotate the left motor 21 and the right motor 22, respectively, when the left steering lever 6a and the right steering lever 6b are in the neutral state. The left steering lever 6a and the right steering lever 6b can be tilted in different directions from each other relative to their positions in the neutral state. In this case, the electric riding lawn mower can be turned (rotated) on the spot.

The operation instructions are transmitted to the operation instruction determination portion 33 from the instruction receiving portion 31. An operation instruction is an instruction including a rotation direction and a rotation speed requested for each of the left driving wheel 2a and the right driving wheel 2b. The operation instruction determination portion 33 determines whether the rotation direction requested for the left driving wheel 2a and the rotation direction requested for the right driving wheel 2b are the same rotation direction as each other, or different directions from each other. The determination result obtained by the operation instruction determination portion 33 is transmitted to the speed instruction value correction portion 34, which will be described below.

If the operation instruction is an operation instruction to rotate the pair of left and right driving wheels 2 in the same direction as each other, the speed instruction value correction portion 34 corrects one of the speed instruction values calculated for the traveling control unit 3 by the speed instruction value calculation portion 32, based on the other speed instruction value. Whether "the operation instruction is an operation instruction to rotate the pair of left and right driving wheels 2 in the same direction as each other" is specified from the determination result transmitted from the operation instruction determination portion 33. "The speed instruction values calculated for the traveling control unit 3 by the speed instruction value calculation portion 32" are the respective rotation speeds of the left motor 21 and the right motor 22 that respectively enable the left driving wheel 2a and the right driving wheel 2b to achieve the respective rotation directions and rotation speeds requested as the operation instructions, and they are transmitted from the speed instruction value calculation portion 32. "One of the speed instruction values" is a speed instruction value requested for one of the left motor 21 and the right motor 22, and "the other speed instruction value" is a speed instruction value requested for the other of the left motor 21 and the right motor 22.

In the present embodiment, if the operation instruction is an operation instruction to rotate the pair of left and right driving wheels 2 in the same direction as each other, the speed instruction value correction portion 34 corrects the larger one of the speed instruction values calculated for the traveling control unit 3 by the speed instruction value calculation portion 32, based on the smaller speed instruction value.

Specifically, the speed instruction value correction portion 34 corrects the speed instruction value in the following manner. First, a turning component is extracted from the speed instruction value requested for the left motor 21 and the speed instruction value requested for the right motor 22. A turning component is a value obtained by subtracting the smaller one of the speed instruction values from the larger speed instruction value.

The smaller speed instruction value is directly used as the speed instruction value. For the larger speed instruction value, the sum of the smaller speed instruction value and the product of the above-described turning component and a preset attenuation value is used as the speed instruction value. The preset attenuation value is a value corresponding to a gain, and it is possible to attenuate only the turning component by setting the attenuation value to a value smaller than 1, for example. Of course, the attenuation value may be set to a value greater than or equal to 1.

If the operation instruction is an operation instruction to rotate the pair of left and right driving wheels 2 in different directions from each other, the speed instruction value correction portion 34 corrects each of the speed instruction values calculated for the traveling control unit 3 by the speed instruction value calculation portion 32, based on a preset common attenuation value. Whether "the operation instruction is an operation instruction to rotate the pair of left and right driving wheels 2 in different directions from each other" is specified from the determination result transmitted from the operation instruction determination portion 33. The "preset common attenuation value" corresponds to the above-described gain.

Thus, the speed instruction value correction portion 34 corrects the speed instruction value calculated by the speed instruction value calculation portion 32 and requested for the left motor 21 to the product of that speed instruction value and the above-described gain if the directions in which the left steering lever 6a and the right steering lever 6b are tilted relative to their positions in the neutral state are different from each other, and corrects the speed instruction value calculated by the speed instruction value calculation portion 32 and requested for the right motor 22 to the product of that speed instruction value and the above-described gain. The speed instruction value corrected by the instruction value correction portion 34 is transmitted to the traveling control portion 35, which will be described below.

The traveling control portion 35 supplies power to the left power feeding portion 41 and the right power feeding portion 42 that are constituent elements of the inverter 7, based on the speed instruction value corrected by the speed instruction value correction portion 34. Accordingly, rotation of the left motor 21 and the right motor 22 is controlled, and the left driving wheel 2a and the right driving wheel 2b are rotated, thus enabling traveling and turning of the electric riding lawn mower. The traveling control portion 35 uses a known feedback control to control rotation of the left driving wheel 2a and the right driving wheel 2b. That is, the traveling control portion 35 calculates the rotation speed (torque) of the left driving wheel 2a, i.e., the rotation speed (torque) of the left motor 21, based on a detection result obtained by the left steering angle detection sensor 80a, calculates the rotation speed (torque) of the right driving wheel 2b, i.e., the rotation speed (torque) of the right motor 22, based on a detection result obtained by the right steering angle detection sensor 80b, and calculates the power amount based on these rotation speeds (torques). For this calculation, it is preferable to use a table or a function representing the relationship between the operation position and the rotation speed. Based on the power amount calculated in this manner and the speed instruction value corrected by the speed instruction value correction portion 34, rotation of the left driving wheel 2a and the right driving wheel 2b is controlled.

When the tread of the electric riding lawn mower is smaller than the wheel base, the gain for the turning instruction increases, and the electric riding lawn mower turns excessively. However, with the traveling control device 1 described above, it is possible to attenuate only the turning component, and, therefore, over-sensitive turning due to the mechanism of the electric riding lawn mower can be reduced using software. Accordingly, it is possible to reduce the turning speed, and improve the ability of the electric riding lawn mower to travel straight ahead. Furthermore, it is possible to prevent attenuation of the maximum speed of the electric riding lawn mower despite the turning component being attenuated.

Control of Motors

Figure 4:
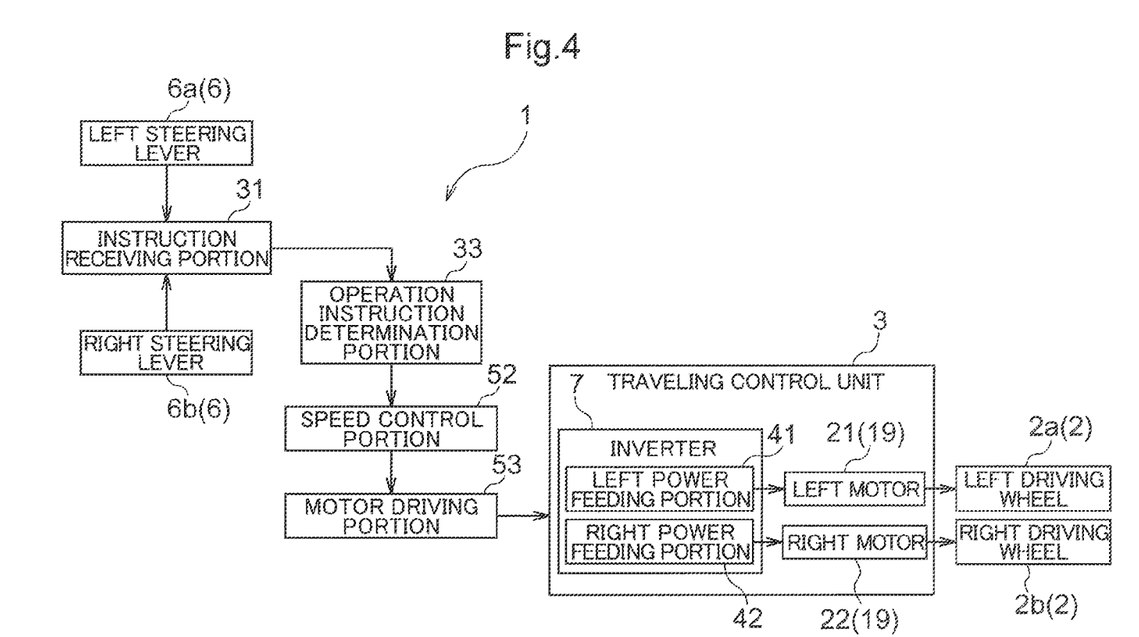
FIG. 4 is a block diagram showing a configuration of the traveling control device.

FIG. 4 is a block diagram schematically showing a configuration of the traveling control device 1. As shown in FIG. 4, the traveling control device 1 includes various functional portions, namely, motors 19, an instruction receiving portion 31, an operation instruction determination portion 33, a speed control portion 52, and a motor driving portion 53. Each of these functional portions is constructed by hardware or software, or both hardware and software, with a CPU serving as the core member, in order to execute processes relating to the traveling and the turning of the electric riding lawn mower. Note that FIG. 4 also shows the left steering lever 6a, the right steering lever 6b, the traveling control unit 3, the left driving wheel 2a, and the right driving wheel 2b described above, in addition to the traveling control device 1.

The configuration of the traveling control unit 3 is the same as that of the traveling control unit 3 described above. The motors 19 include a pair of left and right motors. In the present embodiment, the left motor 21 and the right motor 22 described above corresponds to the pair of left and right motors. The motors 19 respectively drive the pair of left and right driving wheels 2, and the current that is passed through each of the motors 19 is controlled by proportional-integral (PI) control. The pair of left and right driving wheels 2 are a left driving wheel 2a and a right driving wheel 2b. The left motor 21 drives the left driving wheel 2a, and the right motor 22 drives the right driving wheel 2b. PI control includes proportional action (P) in which control proportional to the difference (the current deviation) from the target value is performed (correction output is performed), and integral action (I) in which control proportional to the magnitude of the integral (cumulative value) of the difference (the previous deviation) from the target value is performed (correction output is performed). The current that is passed through each of the motors 19 is a current that is passed through a coil of the motor 19 in order to output a rotational force from the motor 19. This current is controlled by PI control. Since the PI control of the current flowing through the motor 19 is known, the description thereof is omitted here.

The instruction receiving portion 31 receives an operation instruction directed to each of the pair of left and right motors 19. The pair of left and right motors 19 are a left motor 21 and a right motor 22. The operation instruction directed to each of the pair of left and right motors 19 is an instruction including a rotation direction and a rotation speed that are requested for each of the left motor 21 and the right motor 22. The operation instruction directed to the left motor 21 is input through the left steering lever 6a, and the operation instruction directed to the right motor 22 is input through the right steering lever 6b. The operation instruction directed to the left motor 21 corresponds to the operation instruction directed to the left driving wheel 2a, and the operation instruction directed to the right motor 22 corresponds to the operation instruction directed to the right driving wheel 2b. The operation instruction directed to the left driving wheel 2a corresponds to a detection result obtained by the left steering angle detection sensor 80a (hereinafter, see FIG. 2 for all cases), and the operation instruction directed to the right driving wheel 2b corresponds to a detection result obtained by the right steering angle detection sensor 80b (hereinafter, see FIG. 2 for all cases). Accordingly, the instruction receiving portion 31 receives the operation instruction directed to the left driving wheel 2a via the left steering angle detection sensor 80a, and receives the operation instruction directed to the right driving wheel 2b via the right steering angle detection sensor 80b. The operation instructions received by the instruction receiving portion 31 are transmitted to the operation instruction determination portion 33, which will be described below.

The operation instruction determination portion 33 determines whether each of the operation instructions is an acceleration instruction or a deceleration instruction. The operation instructions are transmitted from the instruction receiving portion 31 described above. An operation instruction is an instruction including a rotation direction and a rotation speed that are requested for each of the left driving wheel 2a and the right driving wheel 2b.

The operation instruction determination portion 33 determines that the operation instruction is an acceleration instruction if the rotation speed requested for the left driving wheel 2a is larger than the current rotation speed, and determines that the operation instruction is a deceleration instruction if the aforementioned rotation speed is smaller than the current rotation speed. Similarly, the operation instruction determination portion 33 determines that the operation instruction is an acceleration instruction if the rotation speed requested for the right driving wheel 2b is larger than the current rotation speed, and determines that the operation instruction is a deceleration instruction if the aforementioned rotation speed is smaller than the current rotation speed. The determination result obtained by the operation instruction determination portion 33 is transmitted to the speed control portion 52, which will be described below.

If the operation instruction is an acceleration instruction, the speed control portion 52 sets, when the rotation speed of the motor 19 becomes greater than or equal to a preset first threshold, an integral gain in the PI control to a preset first value, and sets a proportional gain in the PI control to a preset second value. If the operation instruction is a deceleration instruction, the speed control portion 52 sets, when the rotation speed of the motor 19 becomes less than a preset second threshold that is smaller than the first threshold, the integral gain to zero, and sets the proportional gain to a preset third value. In the present embodiment, the speed control portion 52 sets the proportional gain to the third value that is smaller than the second value. The speed control portion 52 can specify whether the operation instruction is an acceleration instruction or a deceleration instruction from the determination result transmitted from the operation instruction determination portion 33. The rotation speed of the motor 19 is the rotation speed of each of the right motor 22 and the left motor 21. In the present embodiment, the rotation speed of the left motor 21 is detected by the left rear wheel rotation detection sensor 70a (see FIG. 2) as the rotation speed of the left driving wheel 2a, and the rotation speed of the right motor 22 is detected by the right rear wheel rotation detection sensor 70b (see FIG. 2) as the rotation speed of the right driving wheel 2b.

Figure 5:
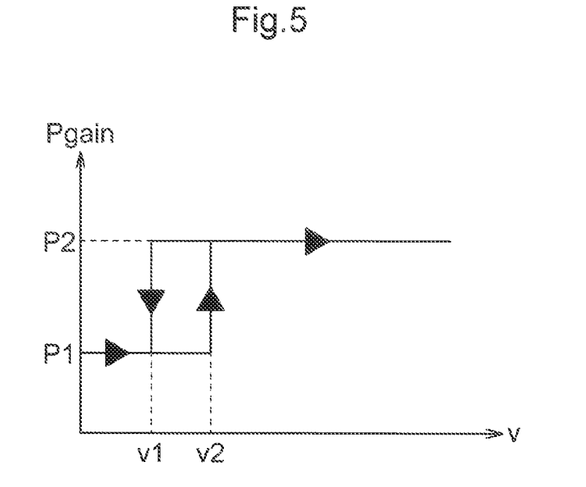
FIG. 5 is a characteristic diagram of proportional action in PI control.
Figure 6:
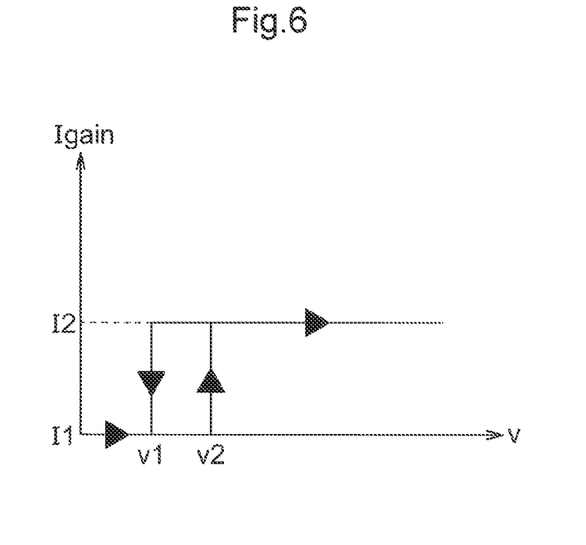
FIG. 6 is a characteristic diagram of integral action in PI control.

Here, the speed control portion 52 uses the above-described PI control to drive each of the left motor 21 and the right motor 22. In particular, in the present embodiment, the proportional action (proportional control) in the PI control is performed as indicated by the characteristic diagram shown in FIG. 5, and the integral action (integral control) in the PI control is performed as indicated by the characteristic diagram shown in FIG. 6. In FIG. 5, the horizontal axis represents the rotation speed, and the vertical axis represents the proportional gain. In FIG. 6, the horizontal axis represents the rotation speed, and the vertical axis represents the integral gain. Although the details will be described later, v1 is the gain switching point during deceleration, and v2 is the gain switching point during acceleration in FIGS. 5 and 6.

If the operation instruction is an acceleration instruction, the speed control portion 52 sets, when the rotation speed of the motor 19 becomes greater than or equal to the preset first threshold (corresponding to v2 in FIGS. 5 and 6), a proportional gain in the PI control to the preset second value (corresponding to P2 in FIG. 5), and sets an integral gain in the PI control to the preset first value (corresponding to I2 in FIG. 6). This setting is performed separately for each of the left motor 21 and the right motor 22.

If the operation instruction is a deceleration instruction, the speed control portion 52 sets, when the rotation speed of the motor 19 becomes less than the preset second threshold (corresponding to v1 in FIGS. 5 and 6) that is smaller than the first threshold (corresponding to v2 in FIGS. 5 and 6), the proportional gain to the preset third value (corresponding to P1 in FIG. 5) that is smaller than the second value (corresponding to P2 in FIG. 5), and sets the integral gain to zero (corresponding to I1 in FIG. 6) (disables the integral action). This setting is also separately performed for each of the left motor 21 and the right motor 22. Accordingly, by setting the integral gain to zero in the low speed range, control is performed only by the proportional control, thus permitting a steady-state speed deviation (preventing the driving wheels 2 from following the operation instructions (acceleration instructions)).

Here, it is preferable that switching of each of the integral gain and the proportional gain has a hysteresis, as shown in FIGS. 5 and 6. Such a hysteresis makes it possible to prevent an erroneous operation in the neighborhood of thresholds (the first threshold and the second threshold) of the rotation speed. The integral gain and the proportional gain set by the speed control portion 52 are transmitted to the motor driving portion 53, which will be described below.

Referring back to FIG. 4, the motor driving portion 53 drives the motors 19, based on the integral gain and the proportional gain set by the speed control portion 52. In the present embodiment, the motor driving portion 53 supplies power to the left power feeding portion 41 and the right power feeding portion 42 that are constituent elements of the inverter 7, based on the integral gain and the proportional gain set by the speed control portion 52. Accordingly, rotation of the left motor 21 and the right motor 22 is controlled, and the left driving wheel 2*a* and the right driving wheel 2*b* are rotated, thus enabling traveling and turning of the electric riding lawn mower. The motor driving portion 53 uses a known feedback control to control rotation of the left driving wheel 2*a* and the right driving wheel 2*b*. That is, the motor driving portion 53 calculates the rotation speed (torque) of the left driving wheel 2*a*, i.e., the rotation speed (torque) of the left motor 21, based on a detection result obtained by the left steering angle detection sensor 80*a*, calculates the rotation speed (torque) of the right driving wheel 2*b*, i.e., the rotation speed (torque) of the right motor 22, based on a detection result obtained by the right steering angle detection sensor 80*b*, and calculates the power amount based on these rotation speeds (torques). For this calculation, it is preferable to use a table or a function representing the relationship between the operation position and the rotation speed. Based on the power amount calculated in this manner, the motor driving portion 53 controls rotation of the left driving wheel 2*a* and the right driving wheel 2*b*.

Other Embodiments

In the above-described embodiment, an example is shown in which the steering lever 6 is installed on the vehicle body 15 of the electric riding lawn mower. However, the electric riding lawn mower may be remotely operable. In this case, it is possible to adopt a configuration in which the turning component is extracted based on the operation of the steering levers 6 that is performed by a remote controller through which the steering levers 6 are remotely operated.

In the above-described embodiment, if the operation instruction is an operation instruction to rotate the pair of left and right driving wheels 2 in the same direction as each other, the speed instruction value correction portion 34 corrects the larger one of the speed instruction values calculated for the traveling control unit 3 by the speed instruction value calculation portion 32, based on the smaller speed instruction value. However, the speed instruction value correction portion 34 may be configured to correct the smaller one of the speed instruction values calculated for the traveling control unit 3 by the speed instruction value calculation portion 32, based on the larger speed instruction value.

In the above-described embodiment, the speed instruction value correction portion 34 corrects the speed instruction value to the sum of the smaller one of the speed instruction values requested for the left motor 21 and the right motor 22, and the product of the turning component extracted from two speed instruction values and the preset attenuation value. However, this is merely an example, and the speed instruction value correction portion 34 may be configured to perform the correction by a different method. The attenuation value may be calculated based on any of the larger one of two speed instruction values, the smaller one of two speed instruction values, and the difference between two speed instruction values. This can prevent the attenuation amount from being excessively increased or decreased, and it is therefore possible to make the traveling vehicle travel smoothly.

In the above-described embodiment, if the operation instruction is an operation instruction to rotate the pair of left and right driving wheels 2 in different directions from each other, the speed instruction value correction portion 34 corrects each of the speed instruction values calculated for the traveling control unit 3 by the speed instruction value calculation portion 32, based on the preset common attenuation value. However, the speed instruction value correction portion 34 may be configured to directly use each of the speed instruction values calculated for traveling control unit 3 by the speed instruction value calculation portion 32 without correcting the speed instruction values, based on the preset common attenuation value, or may be configured to correct the speed instruction values, based on different attenuation values from each other. In such a case, for example, the speed instruction value correction portion 34 may be configured to correct one of the speed instruction values that has a larger absolute value, based on the speed instruction value having a smaller absolute value, or may be configured to correct one of the speed instruction values that has a smaller absolute value, based on the speed instruction value having a larger absolute value. The attenuation value may be calculated based on any of the larger one of two speed instruction values, the smaller one of two speed instruction values, and the difference between two speed instruction values. This can prevent the attenuation amount from being excessively increased or decreased, and it is therefore possible to make the traveling vehicle travel smoothly.

In the above-described embodiment, switching of each of the integral gain and the proportional gain has a hysteresis. However, it is possible to adopt a configuration in which switching of one of the integral gain and the proportional gain has a hysteresis, or a configuration in which switching of both the integral gain and the proportional gain do not have a hysteresis.

In the above-described embodiment, if the operation instruction is a deceleration instruction, the speed control portion 52 sets, when the rotation speed of the motor 19 becomes smaller than the preset second threshold that is smaller than the first threshold, the integral gain to zero, and sets the proportional gain to the preset third value, and the motor driving portion 53 drives the motor 19, based on the integral gain and the proportional gain set by the speed control portion 52. However, if the operation instruction is a deceleration instruction, the motor driving portion 53 may be configured to, when the speed of the traveling vehicle is less than a preset value, drive the motor 19 using a torque control based on the output torque of the motor 19 instead of driving the motor 19 based on the rotation speed, even when the rotation speed of the motor 19 is less than the second threshold. With such a configuration, for example, even in a situation where the ground surface on which the traveling vehicle travels is slippery and the driving wheels 2 slip, it is possible to prevent slipping by using the torque control, thus making it possible to prevent the formation of unwanted marks in the ground surface. The motor driving portion 53 may also be configured to set the gain in the PI control to zero, convert, into torques, the detection result obtained by the left steering angle detection sensor 80*a* that detects the operation amount (pivoting angle) of the left steering lever 6*a* and the detection result obtained by the right steering angle detection sensor 80*b* that detects the operation amount (pivoting angle) of the right steering lever 6*b*, and perform driving in accordance with a torque command. Of course, the motor driving portion 53 may perform driving in accordance with a current command.

In the above-described embodiment, the speed control portion 52 sets the proportional gain to the third value that is smaller than the second value. However, the speed control portion 52 may be configured to set the proportional gain to a third value that is larger than the second value, or may be configured to set the proportional gain to a third value that is the same value as the second value.

In the above-described embodiment, an electric riding lawn mower is described as an example of the traveling vehicle in which the traveling control device 1 is installed. However, the traveling vehicle may be a different vehicle.

Although the traveling control device 1 may perform both the rotation direction control of the driving wheels described with reference to FIG. 3 and the motor control described with reference to FIGS. 4 and 5, the traveling control device 1 may perform one of these controls.

INDUSTRIAL APPLICABILITY

The present invention can be used for a traveling control device of a traveling vehicle capable of driving each of a pair of left and right driving wheels.

DESCRIPTION OF REFERENCE SIGNS

1: Traveling control device
2: Driving wheel
3: Traveling control unit
19: Motor
31: Instruction receiving portion
32: Speed instruction value calculation portion
33: Operation instruction determination portion
34: Speed instruction value correction portion
52: Speed control portion
53: Motor driving portion

What is claimed is:

1. A traveling control device of a traveling vehicle including a traveling control unit having a pair of left and right configurations capable of respectively driving a pair of left and right driving wheels, the traveling control device comprising:
an instruction receiving portion that receives an operation instruction directed to each of the pair of left and right driving wheels;
a speed instruction value calculation portion that calculates a speed instruction value that is to be instructed to the traveling control unit, based on each of the operation instructions; and
a processor that:
determines, based on each of the operation instructions, whether the operation instruction is an operation instruction to rotate the pair of left and right driving wheels in the same direction as each other, or an operation instruction to rotate the pair of left and right driving wheels in different directions from each other; and
in response to the operation instruction being an operation instruction to rotate the pair of left and right driving wheels in the same direction as each other, extracts a turning component value by subtracting a smaller value of the speed instruction values from a larger value of the speed instruction values, corrects the larger value of the speed instruction values by setting the larger value of the speed instruction values to be a sum of the smaller value of the speed instruction values and a product of the turning component value and a preset attenuation value, and rotates one of the driving wheels corresponding to the larger value of the speed instruction values based on the corrected larger value of the speed instruction values.

2. The traveling control device according to claim 1, wherein the processor corrects, in response to the operation instruction being an operation instruction to rotate the pair of left and right driving wheels in different directions from each other, each of the speed instruction values calculated for the traveling control unit by the speed instruction value calculation portion, based on a preset common attenuation value, and rotates the left and right driving wheels based on the corrected speed instruction values.

3. A traveling control device of a traveling vehicle capable of driving each of a pair of left and right driving wheels, the traveling control device comprising:
a pair of left and right motors that respectively drive the pair of left and right driving wheels, and a current that is passed therethrough is controlled by PI control;
an instruction receiving portion that receives an operation instruction directed to each of the pair of left and right motors;
a motor driving portion that drives the motors, based on an integral gain and a proportional gain in the PI control; and
a controller that
determines whether each of the operation instructions is an acceleration instruction or a deceleration instruction directed to the corresponding motor,
in response to the operation instruction being an acceleration instruction, sets the integral gain to a preset first value, and sets the proportional gain to a preset second value when a rotation speed of each of the motors becomes greater than or equal to a preset first threshold, and
in response to the operation instruction being a deceleration instruction, sets the integral gain to zero, and sets the proportional gain to a preset third value when the rotation speed of the motor becomes less than a preset second threshold that is smaller than the first threshold.

4. The traveling control device according to claim 3, wherein switching of each of the integral gain and the proportional gain has a hysteresis.

5. The traveling control device according to claim 3, wherein, when a vehicle speed of the traveling vehicle is less than a preset value, in response to the operation instruction being a deceleration instruction, the motor driving portion drives the corresponding motor by a torque control in accordance with an output torque of the motor instead of driving the motor in accordance with the rotation speed, even when the rotation speed of the motor is less than the second threshold.

* * * * *